Dec. 2, 1969   L. G. FENERLI   3,481,037
THROW AWAY SPAGHETTI FORK
Filed April 22, 1968
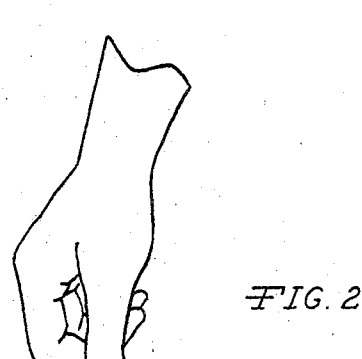
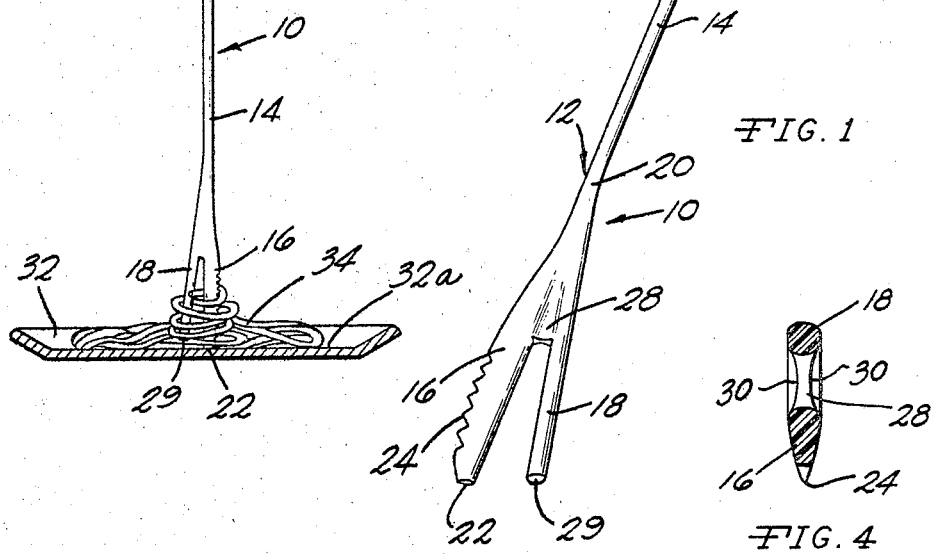
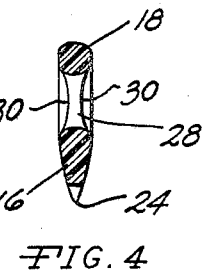
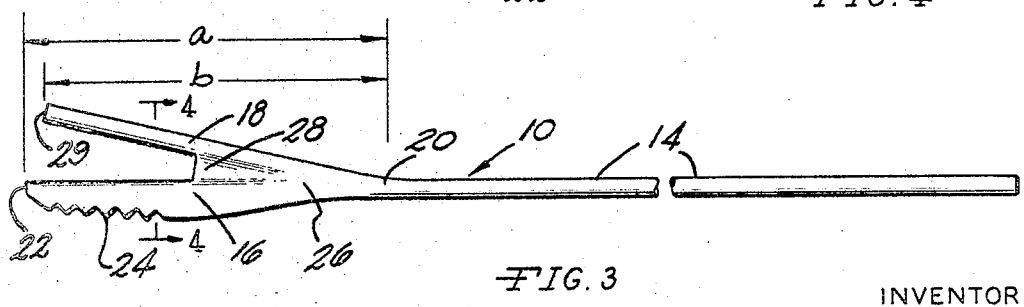
INVENTOR
LIGOR GREGORY FENERLI
BY
*Olsen and Stephenson*
ATTORNEYS

United States Patent Office

3,481,037
Patented Dec. 2, 1969

---

3,481,037
THROWAWAY SPAGHETTI FORK
Ligor Gregory Fenerli, Ann Arbor, Mich., assignor to Spaghetti Factory, Inc., Ann Arbor, Mich., a corporation of Michigan
Filed Apr. 22, 1968, Ser. No. 722,848
Int. Cl. A47j 43/28
U.S. Cl. 30—147    4 Claims

ABSTRACT OF THE DISCLOSURE

A spaghetti fork which is sufficiently simple and inexpensive to manufacture that it can be thrown away after a single use comprising a one-piece body having a handle and two diverging tines at one end of the handle. One of the tines constitutes an extension of the handle and is longer than the other tine thereby enabling rotation of the handle with the long tine engaged with the spaghetti plate so as to rotate the other tine through the spaghetti and roll it up on the fork. The longer tine has a serrated cutting edge to enable cutting of the spaghetti when desired, and a dished web between the tines enables manipulation of the fork to accumulate desired amounts of sphaghetti sauce thereon.

BACKGROUND OF THE INVENTION

There have been numerous improvements in the spaghetti fork field. Examples of alleged improvements are the spaghetti forks illustrated in U.S. Patents 2,748,479, 2,841,869, 3,138,879, and 2,602,996. However, none of these prior patents teaches a construction that would enable mass manufacture of simple, inexpensive forks which can be thrown away after a single use.

It is an object of this invention, therefore, to provide an improved throwaway spaghetti fork.

SUMMARY OF THE INVENTION

The spaghetti fork of this invention is readily manufactured in one-piece plastic form. The one-piece body which constitutes the fork includes an elongated handle and two tines that are formed integral with one end of the handle. The tines are arranged in a diverging relation, with one of the tines extending beyond the other and being aligned with the handle. This enables the longer tine to be thrust into the spaghetti to a position engaged with the spaghetti plate and then rotated about the axis of the handle so that the other tine moves in a clearance relation with the plate and winds the spaghetti onto the fork. A dished web between the tines enables manipulation of the fork to place a desired amount of spaghetti sauce on the fork. In addition, one of the tines has a serrated cutting edge so that the spaghetti can be cut when desired.

Further objects, features and advantages of this invention will become apparent from a consideration of the following description, the appended claims, and the accompanying drawing in which:

FIGURE 1 is a perspective view of the spaghetti fork of this invention;

FIGURE 2 is a view of the spaghetti fork of this invention in use;

FIGURE 3 is an elevational view of the spaghetti fork of this invention; and

FIGURE 4 is an enlarged transverse sectional view of the fork of this invention as seen from substantially the line 4—4 in FIG. 3.

With reference to the drawing, the spaghetti fork of this invention, indicated generally at 10, is illustrated in FIG. 1 as consisting of a one-piece body 12, preferably formed of an inexpensive plastic material. The body 12 includes an elongated straight handle 14 and two tines 16 and 18 formed integral with one end 20 of the handle 14 and arranged in a relatively diverging acute angle relation. The tine 16 constitutes an extension of the handle 14 and is substantially aligned with the handle 14. The tine 16 terminates in an end 22 and is provided with a serrated cutting edge 24. As shown in FIG. 4, the tine 16 is of a somewhat flattened shape in cross section to enable forming of the cutting edge 24.

The tine 18, which terminates in an end 29, is more cylindrical or rod-like in shape and at the juncture 26 of the tines 16 and 18 and the handle end 20, a web 28 is formed which extends between the tines 16 and 18. As shown in FIG. 4, opposite surfaces 30 of the web 28 are of a dished shape for a purpose to appear presently.

The relative lengths of the tines 16 and 18, which best appears in FIG. 3, is an important feature of the present invention. As shown in FIG. 3, the tine 16 is of a length measured in a direction parallel to the handle 14, indicated at a, from its end 22 to the end 20 of the handle 14. The tine 18 is of a length measured in the same direction, indicated at b, which is less than the length a. This relationship enables use of the spaghetti fork 10 of this invention in the manner illustrated in FIG. 2. As shown therein, the handle 14 is grasped and is disposed so that it is substantially perpendicular to the main support surface 32a of the plate 32 on which the spaghetti 34 to be eaten is located. With the end 22 of the tine 16 supported on the surface 32a, the handle 14 can be rotated about its axis with the end 29 of the tine 18 in a clearance relation with the surface 32a. This enables the fork 10 to be rotated so as to wind the spaghetti 34 onto the tines 16 and 18 as illustrated in FIG. 2.

Should it be desired prior to the winding operation illustrated in FIG. 2 to cut any of the spaghetti 34, the fork 10 is readily manipulated so as to use the cutting edge 24 to cut the spaghetti 34. In addition, the fork 10 can be manipulated in the spaghetti 34 so as to more or less "scoop" spaghetti sauce onto the uppermost one of the web surfaces 30. Thus, the user can manipulate the fork 10 so as to obtain the desired amount of spaghetti and can also exert some control over the amount of sauce collected on the fork 10.

From the above description it is seen that this invention provides an improved one-piece spaghetti fork 10 which is extremely simple in construction and inexpensive to manufacture in large volumes. This enables the fork to be used as a throwaway utensil so that is can be discarded after one use. In operation, the fork 10 is effective to obtain the desired loading of spaghetti onto the fork by virtue of the above-described relationship of the tines 16 and 18 and the handle 14.

What is claimed is:

1. A spaghetti eating fork for one-handed use comprising a one-piece body having an elongated handle, exactly two pick-up tines formed integral with and extending away from one end of said handle, one of said tines being an extension of and in substantial alignment with said handle, said one tine terminating in an end located a predetermined distance from said handle measured along a straight line extending from said end through the opposite end of said handle, the other one of said tines terminating in an end spaced from said handle a distance less than said predetermined distance measured along a line parallel to said first line, whereby said end of said one tine can be supported on a surface which is substantially perpendicular to said straight line and said handle can be rotated about said straight line as an axis with said end of said other one of said tines in a clearance relation with said surface.

2. A spaghetti eating fork according to claim wherein said tines are substantially straight and said other one of said tines extends at an acute angle relative to said one tine.

3. A spaghetti fork according to claim 2 further including a web extending between said tines, said web extending from the juncture of said tines toward the ends of said tines and having opposite sides thereof of a dished shape.

4. A spaghetti fork according to claim 3 wherein said one tine is provided with a serrated cutting edge.

References Cited

UNITED STATES PATENTS

| | | | |
|---|---|---|---|
| 1,056,614 | 3/1913 | Weikert | 30—322 X |
| 2,185,942 | 1/1940 | Frank | 30—147 |
| 2,841,869 | 7/1958 | Levine | 30—332 |
| 2,864,163 | 12/1958 | Boruvka | 30—322 X |
| 3,121,951 | 2/1964 | Green | 30—149 |
| 3,138,871 | 6/1964 | Sears | 30—322 |

FOREIGN PATENTS 1,463,984  11/1966  France.

ROBERT C. RIORDON, Primary Examiner

J. C. PETERS, Assistant Examiner

U.S. Cl. X.R.

30—322; D44—29